United States Patent [19]
Clark et al.

[11] Patent Number: 5,995,101
[45] Date of Patent: Nov. 30, 1999

[54] MULTI-LEVEL TOOL TIP

[75] Inventors: David W. Clark, Gilroy; Lance Lewis, San Ramon; Thomas W. McRae, San Jose; Randolph A. Strauss, Mountain View, all of Calif.

[73] Assignee: Adobe Systems Incorporated, San Jose, Calif.

[21] Appl. No.: 08/960,299

[22] Filed: Oct. 29, 1997

[51] Int. Cl.[6] .............................. G06F 3/00; G06F 3/14
[52] U.S. Cl. ...................... 345/338; 345/347; 345/339; 345/145
[58] Field of Search .................. 345/145, 302, 345/328, 336, 338, 339, 347, 348, 352, 353, 356, 357

[56] References Cited

U.S. PATENT DOCUMENTS

| | | | |
|---|---|---|---|
| 5,363,481 | 11/1994 | Tilt | 345/352 |
| 5,493,658 | 2/1996 | Chiang et al. | 345/336 |
| 5,524,193 | 6/1996 | Covington et al. | 707/512 |
| 5,528,745 | 6/1996 | King et al. | 345/326 |
| 5,535,422 | 7/1996 | Chiang et al. | 345/338 |
| 5,539,869 | 7/1996 | Spoto et al. | 345/336 |
| 5,617,526 | 4/1997 | Oran et al. | 345/326 |
| 5,748,927 | 5/1998 | Stein et al. | 345/333 |
| 5,801,698 | 9/1998 | Lection et al. | 345/347 |

OTHER PUBLICATIONS

Michael R. Wilson et al., "A Fast and Intuitive Online Help System", Hewlett–Packard Journal, pp. 79–89, Apr. 1994.

*Primary Examiner*—Raymond J. Bayerl
*Assistant Examiner*—X. L. Bautista
*Attorney, Agent, or Firm*—Fish & Richardson P.C.

[57] ABSTRACT

A graphical user interface (GUI) for use in a graphical display on a computer monitor includes a cursor that allows a user to point to an area of interest in the graphical display. The GUI also includes an information element that provides a first level of information in the graphical display when the user first points to the area of interest and then provides a subsequent level of information in the graphical display if the user continues to point to the area of interest or presses a selected keystroke.

44 Claims, 5 Drawing Sheets

MULTI-LEVEL TOOL TIP

TECHNICAL FIELD

This invention relates to computer user interfaces, and more particularly to tool tips that provide detailed information about functions associated with icons or other control areas appearing in computer user interfaces.

BACKGROUND INFORMATION

In the computer world, the term "tool tip" has been used to describe a short textual label that appears over an icon or control area in a graphical user interface (GUI) to provide a brief indication of the program function associated with the icon or control area. Tool tips most commonly are associated with icons appearing in a "tool bar," i.e., a group of icons that each provide a unique graphical image representing a particular function of a computer program. For example, referring to FIG. 1, a tool tip 50 typically appears on a computer display 28 when a user of the computer places a cursor 52 over an icon 54 in a tool bar 56 for a predetermined period of time, known as the "tool tip trigger interval" (typically about one-half second). The tool tip 50 usually consists of a small text box containing a very short (e.g., 1–4 words) description of the program function associated with the icon. When the user selects the icon with a pointing device, such as a mouse, the corresponding function of the computer program is invoked. In some applications, such as Adobe Systems Incorporated's PageMill™ product, the tool tip disappears if, after some predetermined amount of time, known as the "tool tip timeout interval," the user has not selected the icon, moved the mouse, or taken some other prescribed action.

For many icons in the typical program, the brief description provided by the associated tool tip adequately explains, even to a novice user, the program function associated with the icon. However, for many users, the descriptions provided by many tool tips are too brief and too cryptic to provide much insight into the functions of the related icons. The present invention addresses this problem.

SUMMARY

The invention involves providing information in a graphical display about a particular function of a program executing on a computer system. One level of information (e.g., a first-level tool tip) is displayed when a user points with a pointing device, such as a mouse, to an area of the graphical display associated with the function. This area may be an icon or any other type of control area. A subsequent (e.g., a second-level) tool tip is displayed if the user continues to point to the area for a predetermined amount of time ("trigger interval") or presses a selected keystroke.

In certain embodiments, the user may determine the trigger interval. Also, the second-level tool tip may replace the first-level tool tip in the graphical display, and the second-level tool tip may include more or different types of information than the first level tool tip, including text, a video clip, or an audio clip. Additional levels of information (e.g., higher-level tool tips) may be displayed after a previous level of information is displayed. The tool tip may be removed from the graphical display entirely when the user performs a prescribed action.

Advantages of the invention may include one or more of the following: computer users are able to obtain detailed information about the function associated with a control area, such as a tool bar icon, simply by placing and leaving the cursor in or near the control area; the amount and type information provided may change frequently unless the user takes an action indicating that the user no longer wants to receive the information, the information may be presented in text, video, audio, or virtually any other medium; some aspects of the invention allow the user to customize the appearance and content of the information provided and to tailor the presentation of the information to the user's needs.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
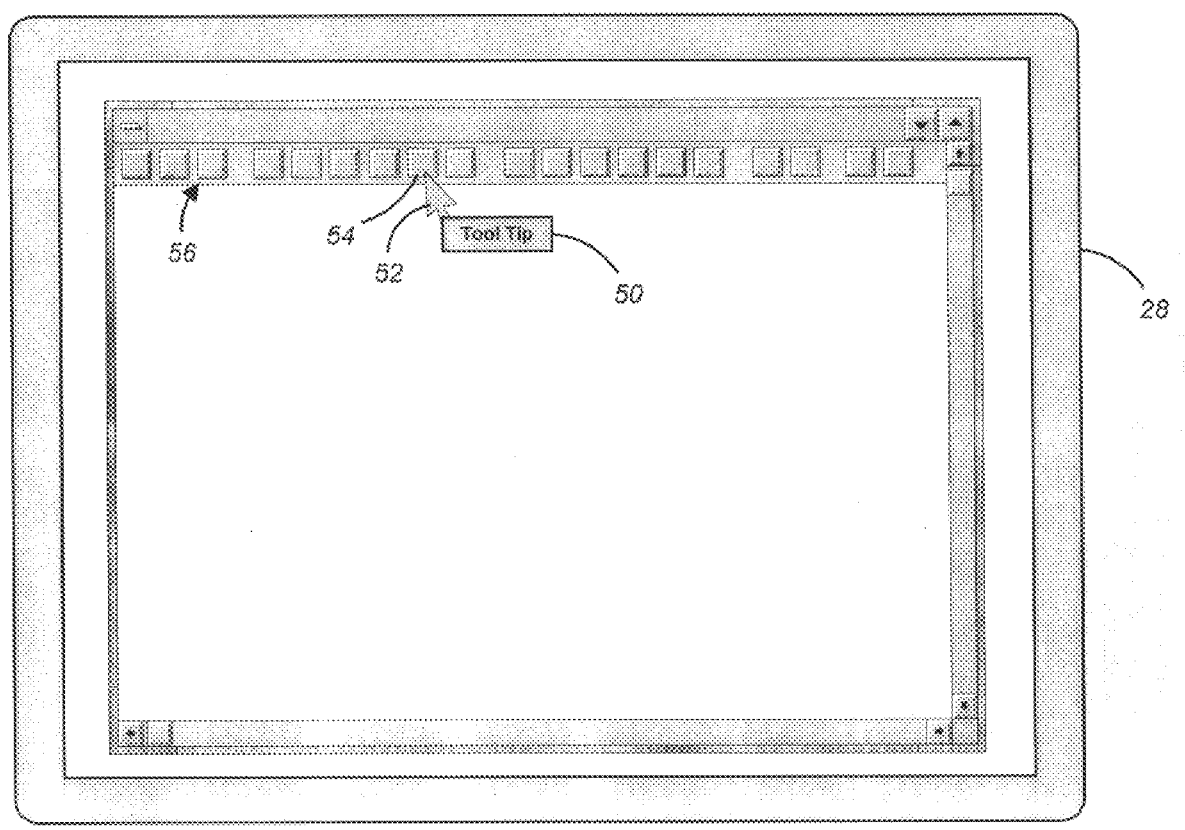
FIG. 1 is a view of a computer display illustrating a conventional tool tip.
Figure 2:
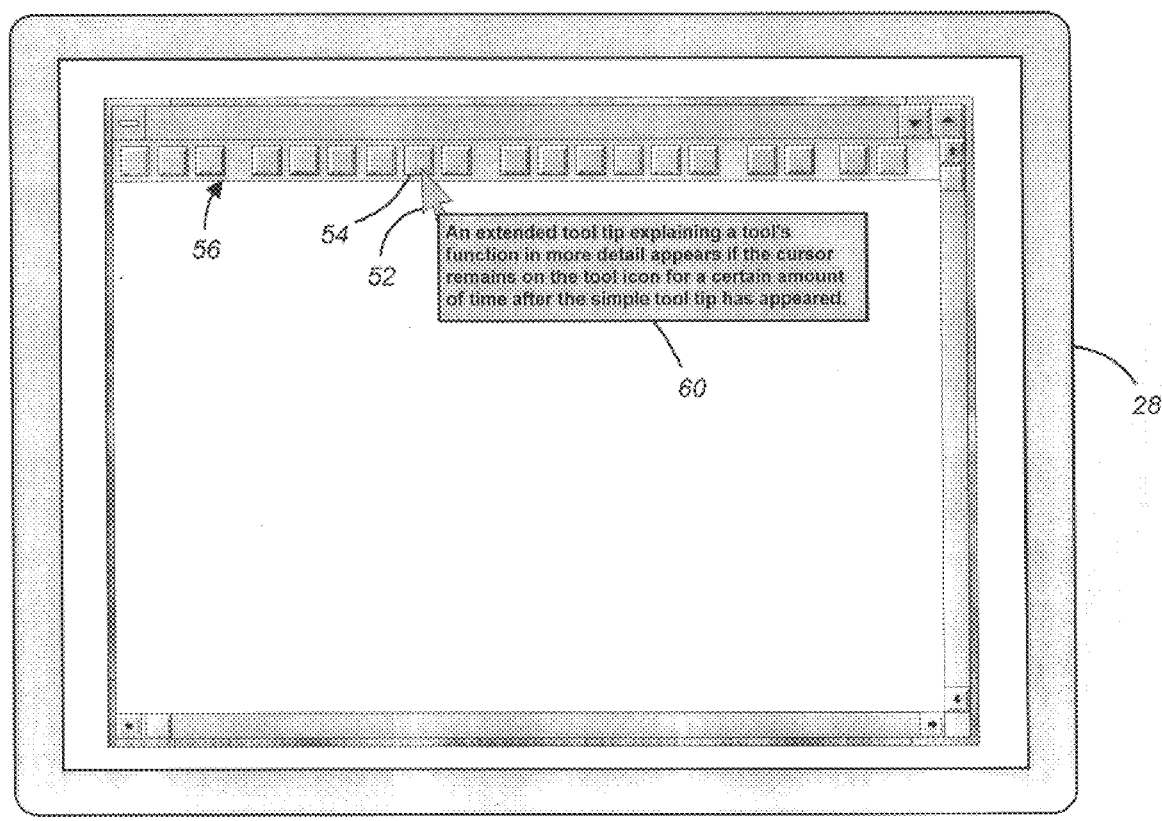
FIGS. 2 and 3 are views of a computer display illustrating extended, or multi-level, tool tips.

An extended or multi-level tool tip initially appears much like the conventional tool tip shown in FIG. 1. However, referring to FIG. 2, in an extended tool tip a second-level tip 60 eventually replaces the original tip (50 in FIG. 1) on the computer display 28 in many instances. For example, the second-level tip 60 may replace the original tip if the user does not move the cursor 52 from over the icon 54 or take some other prescribed action within a predetermined amount of time (the "level-2 tool tip trigger interval") after the original tool tip first appeared, or presses a selected keystroke (or keystroke combination).

The second-level tip 60 typically provides a more detailed textual description of the program function associated with the icon 54 than that provided by the original tip. For example, while the original tip rarely includes more than a few words, the second-level tip 60 typically includes one or more text items describing the function associated with the icon 54. Instead of or in addition to a detailed textual description of the icon's function, the second-level tip 60 may provide a non-textual description, such as those described below.

Figure 3:
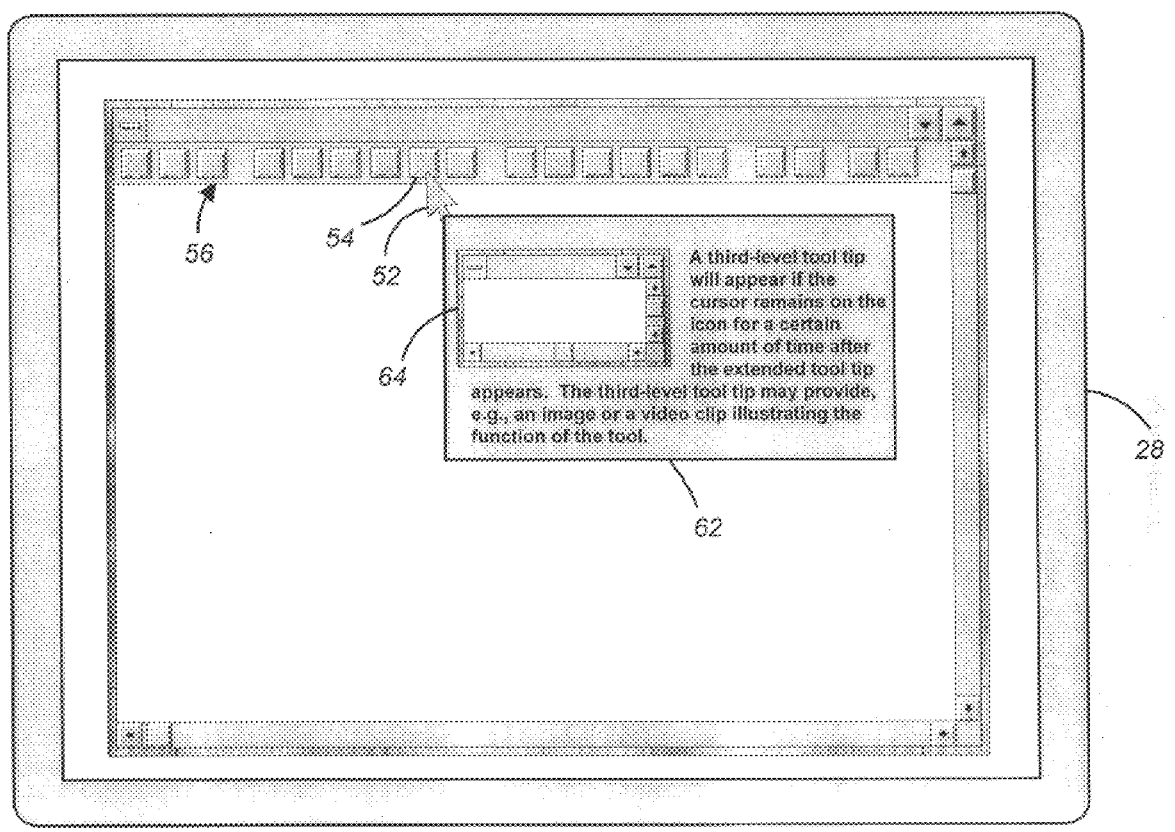

Referring also to FIG. 3, a third-level tip 62 in turn replaces the second-level tip 60 (FIG. 2) if the user does not move the cursor from the icon 54 or take some other prescribed action within a predetermined amount of time (the "level-3 tool tip trigger interval") after the second-level tip 60 first appeared. The third-level tip 62 may include, e.g., an even more detailed textual explanation of the icon's function, a graphical image 64 or a multimedia clip (e.g., an audio/visual clip) demonstrating the icon's function in detail, or a combination of these. The program may include as many additional, higher-level tips as needed to fully demonstrate the program function associated with the icon 54.

In an alternative embodiment, the subsequent level tool tips may be invoked or triggered by activating a selected keystroke or keystroke combination. For example, pressing "SHIFT+ESC" may trigger a next level tool tip after a prior level tool tip has been displayed. Further, one or more selected keystrokes may be used to close a tool tip. For example, pressing "CTRL+ESC" may close a tool tip level, either leaving prior level tool tips displayed, or re-invoking a next prior level tool tip if prior levels had been closed upon display of the tool tip being closed. Pressing "ESC" may close all tool tip levels.

As discussed above, each level of information in a multi-level tool tip is triggered when a corresponding tool tip trigger interval elapses. The various tool tip trigger intervals may be uniform in length; however, a user generally will need progressively more time to review and understand the information provided as the various levels of the tool tip appear, so the tool tip trigger intervals typically become progressively longer. For example, four seconds may be ample to allow the user to read a short first-level tip, but the user may need one minute or longer to review a graphic image or multimedia clip explaining a program function in detail.

The information provided at a given tool tip level may disappear when an associated timeout interval expires, or when the trigger interval for the next-level tip expires, or when the user takes one of several prescribed actions before the timeout or trigger interval is able to expire. For example, the user may terminate the tool tip entirely, e.g., by selecting the corresponding icon and invoking the associated program function, by moving the cursor away from the icon, or by entering a prescribed control command (e.g., a keystroke) before the trigger interval lapses. The program also may allow the user to accelerate the trigger interval at a certain level of the tool tip, e.g., by entering a prescribed control command. For example, a user who wants to proceed quickly to a third-level (or higher-level) tip may be allowed to so by entering a prescribed keystroke or mouse click while a lower-level tip is displayed.

As discussed above, a tool tip may terminate entirely when the user moves the cursor away from the icon or control area associated with the tool tip. In this situation, if the user moves the cursor to another icon or control area immediately, i. e., within a given time interval (e.g., one-half second), any one of several events may occur, including (but not limited to) the following: (1) the tool tip trigger interval for the first-level tip associated with the new icon or control area begins, and the first-level tip for the new icon or control area appears after this interval expires; (2) the first-level tip for the new icon or control area is displayed immediately; (3) a higher-level tip for the new icon or control area is displayed immediately; or (4) the tool tip for the new icon or control area is displayed immediately at the same level at which the recently terminated tool tip was last displayed.

The program designer may predetermine the tool tip trigger intervals, or the program may allow the user to set the intervals, e.g., through a "user options" menu. The program also may allow the user to disable tool tips at certain levels. For example, an inexperienced user may want to disable all but the highest-level tips, which provide the most detailed explanations of the program functions associated with the corresponding icons or control areas. An experienced user may be satisfied with enabling only first level tool tips as a brief reminder of the functions associated with unlabeled icons.

Extended or multi-level tool tips may be provided for essentially any control area in a graphical user interface, including areas not normally associated with tool tips. For example, Adobe's web page authoring product, PageMill™, includes a tool tip explaining that a certain text box allows the user to enter a title for a web page under creation. In most software products, tool tips are not provided for this type of control area. In certain embodiments of the invention, however, a multi-level tool tip could be used in this control area, e.g., to explain why the web page should be given a title and to provide an example of an appropriate title.

The visual characteristics of a multi-level tool tip may be fixed by the designer of the tool tip, or these features may be user-adjustable. For example, the program may allow the user to change colors or fonts or to highlight certain words appearing in a tool tip. The program also may allow the user to alter the information provided at the various levels of a multi-level tool tip, for example, by customizing the tool tip information by means of a "user options" control (e.g., dialog, menu, etc.) and storing the customized information in a file on a storage medium. In these situations, the original appearance and contents of the tool tip may be maintained by the program in a "default settings" file, which would allow the user to restore the original settings at any time.

Figure 4:
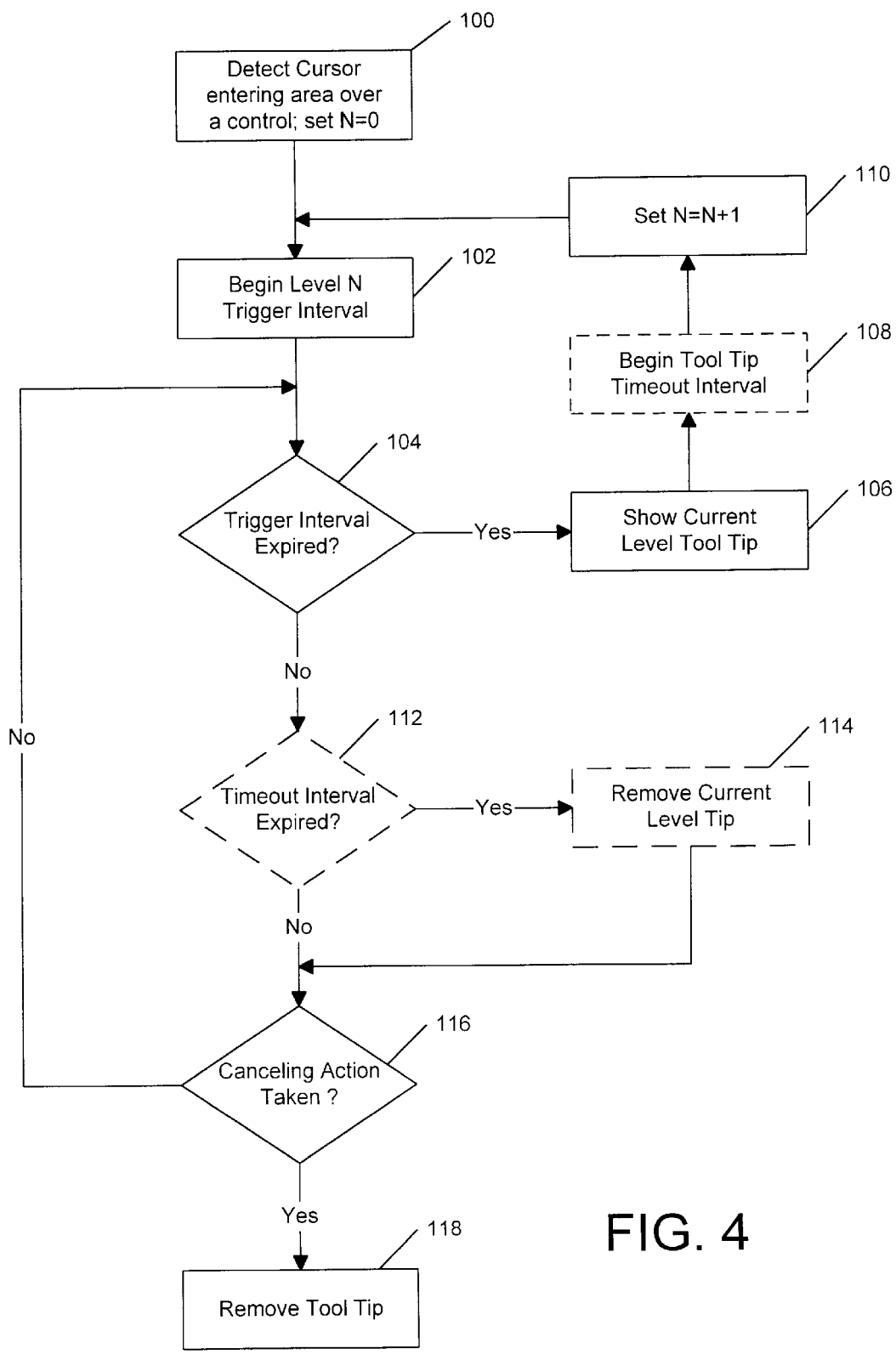
FIG. 4 is a flow chart of the progression through the various levels of a three-level tool tip.

Referring now to FIG. 4, the process for generating a multi-level tool tip begins when the program detects a cursor entering an area over an icon or control associated with the tool tip (step 100). The program sets a counting variable N to zero and then begins a level N trigger interval (step 102). The program waits for the trigger interval to expire (step 104) and, when it does, displays the level N tool tip (step 106). The level N tool tip may replace any prior level tool tip on the display, or the tool tips may be displayed concurrently. Optionally, as soon as the level N tip is displayed, the program starts (or restarts) a tool tip timeout interval (step 108), which may be used in some instances to terminate the current-level tool tip. The program also prepares to display the next-level tip by incrementing the counting variable N by one (step 110), thus beginning the trigger interval for the level N+1 tip, and repeating the process (step 102).

While the program is waiting for the level N trigger interval to expire (step 104), the program may determine whether the current-level tool tip or all tool tips should be removed from the display. More particularly, at some levels of the tool tip, the program optionally may monitor the timeout interval (step 112) and remove the current-level tool tip from the display when the timeout interval expires (step 114). As discussed below, these two steps may not occur at all levels of the tool tip and, for some tool tips, may not occur at all. The program also determines whether the user has performed a canceling action (step 116), such as moving the cursor away from over the icon or control area, or selecting the icon to invoke the associated program function. If so, the program removes the tool tip from the display (step 118); otherwise, the program continues monitoring the current-level trigger interval (step 104).

In general, other tests and actions may be applied, as desired. For example, it would generally be desirable for a tool tip to expire at the same time as the last trigger interval.

Figure 5:
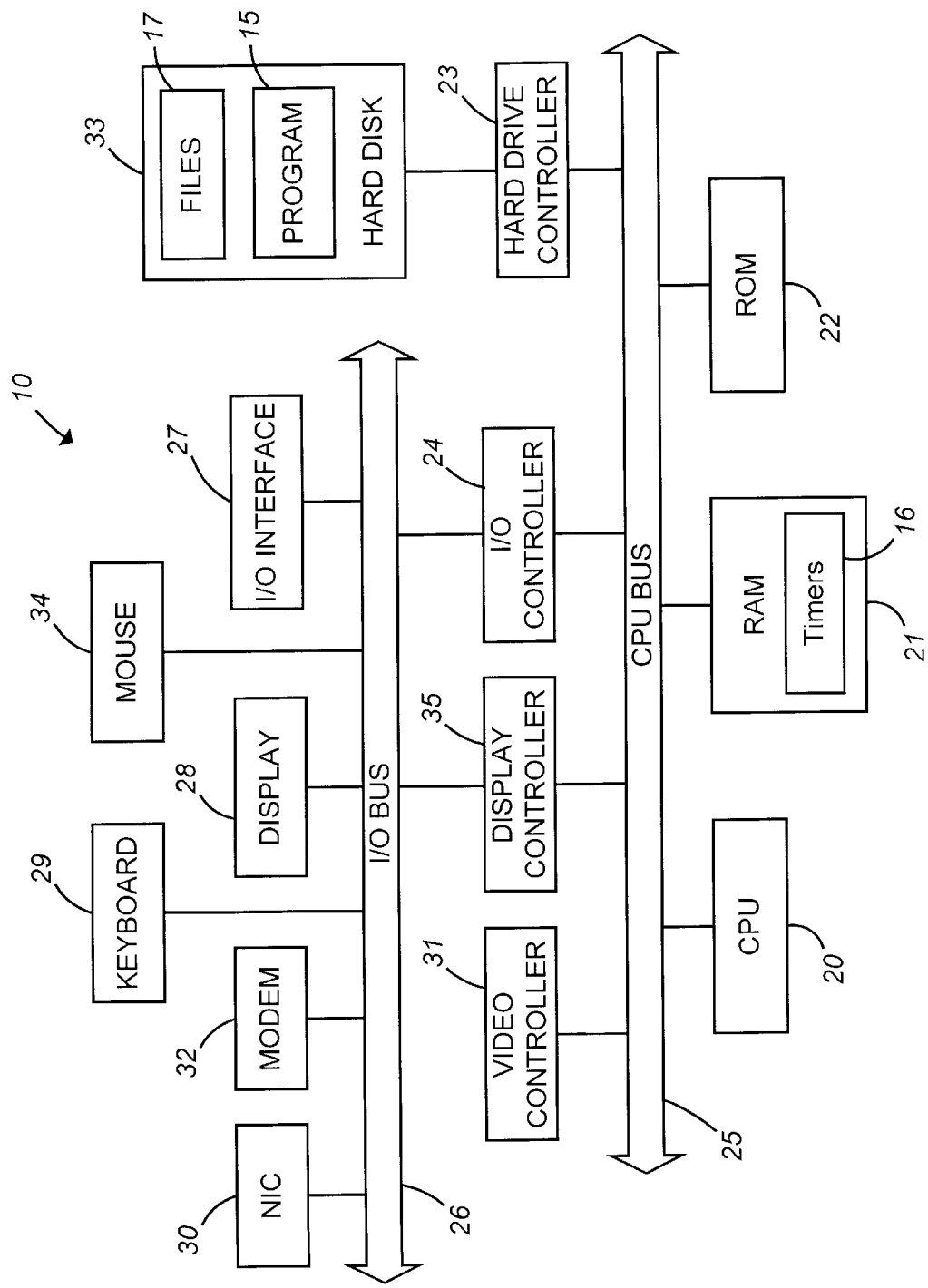
FIG. 5 is a block diagram of a computer system in which programs including extended tool tips may be executed.

Referring to FIG. 5, the invention may be implemented in the form of a graphics-based program 15 containing executable instructions to be carried out in a programmable computer system 10. The invention may be carried out in all types of computer systems, including Windows-based, Unix-based, and Macintosh systems, and including stand-alone computers or computers connected by an intranet, an internet, or the Internet.

When executing, the program 15 maintains one or more timers which serve to mark the various tool tip trigger intervals and, if needed, timeout intervals. The timer associated with a level-1 tool tip trigger interval typically begins when the cursor enters the area over an icon or control area associated with the tool tip. The timers for higher-level tool tip trigger intervals typically begin when the trigger interval for the previous tip level lapses and the cursor remains over an activating area. Normally, only the highest-level tip will have an associated timeout interval since a lower-level tip is replaced by a higher-level tip when the associated higher-level trigger interval expires. However, even the highest-level tip may not have an associated timeout interval since certain types of tips, e.g., multimedia clips, by their nature will terminate automatically. There may be no timeout interval as well, leaving the final tool tip displayed until a canceling action occurs.

More particularly, the computer system 10 includes, among other things, a processor 20, a random access memory (RAM) 21, a non-volatile memory 22 (for example, a writable read-only memory (ROM) such as a flash ROM), a hard drive controller 23, a video controller 31, a display controller 35, and an input/output (I/O) controller 24 coupled by a processor (CPU) bus 25. The system 10 may be preprogrammed, e.g., in ROM, or it may be programmed (and reprogrammed) by loading the program 15 from another source, such as a floppy disk, a CD-ROM, or another computer.

The hard drive controller 23 is coupled to a hard disk 33 suitable for storing executable computer programs, including the graphics-based program 15, and data files 17, including text and multimedia files containing information to be displayed in multi-level tool tips. The video controller 31 may be coupled to a video recorder (not shown), which may be used for storing and importing video footage and for writing final output. The I/O controller 24 is coupled by means of an I/O bus 26 to an I/O interface 27. The I/O interface 27 receives and transmits data (e.g., stills, pictures, movies, and animations for importing into a composition) in analog or digital form over communication links such as a serial link, local area network, wireless link, or parallel link. Also typically coupled to the I/O bus 26 are a display 28, a keyboard 29, a network interface card (NIC) 30, a pointing device such as a mouse 34, and a modem 32 for connecting the system 10 to another computer or to a computer network, e.g., to an Internet service provider (ISP) or an on-line service provider (OSP). Alternatively, separate connections (i.e., separate buses) may be used for some of the components connected to the I/O bus 26, including the I/O interface 27, the display 28 and the keyboard 29.

A number of embodiments of the present invention have been described. Nevertheless, it will be understood that various modifications may be made without departing from the spirit and scope of the invention. For example, while multi-level tool tips have been described as providing information derived from one or more files (e.g., text or multimedia files) stored with the programs containing the tool tips, the information may originate with virtually any source, including, e.g., an Internet resource accessible through hyperlinks in the tool tips. Also, the multiple levels of a multi-level tool tip may be used to provide different types of information, instead of relatively more or less information, about the associated program function. Furthermore, while a multi-level tool tip has been shown in the figures as appearing adjacent a cursor, the tool tip could appear anywhere on the screen. For example, the position of the tool tip may be fixed on the screen, in a containing window, relative to the cursor, or relative to the icon or control beneath the cursor. One or more of the multiple tip levels may appear concurrently on the display, e.g., in cascaded fashion. Cascaded tips may disappear at the same time, or they may have staggered timeouts intervals so that they disappear at different times, e.g., sequentially in the order that they appeared. Accordingly, other embodiments are within the scope of the following claims.

What is claimed is:

1. A graphical user interface for use in a graphical display on a computer monitor, comprising:
   (a) a cursor for pointing to an area of interest in the graphical display; and
   (b) an information element providing a first level of information in the graphical display when the cursor points to the area of interest, and a subsequent level of information in the graphical display if the cursor continues to point to the area of interest.

2. The graphical user interface of claim 1, wherein the subsequent level of information appears only if the cursor continues to point to the area of interest for a predetermined amount of time.

3. The graphical user interface of claim 2, wherein the predetermined amount of time may be determined by a user.

4. The graphical user interface of claim 1, wherein the subsequent level of information replaces the first level of information in the display.

5. The graphical user interface of claim 1, wherein the subsequent level of information includes more information than the first level of information.

6. The graphical user interface of claim 1, wherein the subsequent level of information includes a text item.

7. The graphical user interface of claim 1, wherein the subsequent level of information includes a video clip.

8. The graphical user interface of claim 1, wherein the subsequent level of information includes an audio clip.

9. The graphical user interface of claim 1, wherein the information element provides an additional level of information if the cursor continues to point to the area of interest after a previous level of information is displayed.

10. The graphical user interface of claim 1, wherein the information element disappears when a user takes a prescribed action.

11. The graphical user interface of claim 1, wherein the information element includes a tool tip.

12. The graphical user interface of claim 1, further comprising a second information element that appears when the cursor points to another area of interest in the display.

13. The graphical user interface of claim 1, wherein the information element provides an additional level of information only if the cursor continues to point to the area of interest and at least one keystroke is activated.

14. The graphical user interface of claim 1, where the first level of information describes the area of interest, and the subsequent level of information further describes the area of interest.

15. A method of providing information to a computer user about a particular function of a program executing on the computer, the method comprising:
   (a) displaying in a graphical display one level of information about the function when a cursor points to an area of the graphical display associated with the function; and
   (b) displaying in the graphical display a subsequent level of information when the cursor continues to point to the area.

16. The method of claim 15, wherein the subsequent level of information is displayed only if the cursor continues to point to the area for a predetermined amount of time.

17. The method of claim 16, further comprising allowing the user to determine the predetermined amount of time.

18. The method of claim 15, further comprising replacing the first level of information in the display with the subsequent level of information.

19. The method of claim 15, wherein the subsequent level of information includes more information than the first level of information.

20. The method of claim 15, wherein the subsequent level of information includes a text item.

21. The method of claim 15, wherein the subsequent level of information includes a video clip.

22. The method of claim 15, wherein the subsequent level of information includes an audio clip.

23. The method of claim 15, further comprising providing an additional level of information if the cursor continues to point to the area after a previous level of information is displayed.

24. The method of claim 15, further comprising removing the information element from the graphical display when the user takes a prescribed action.

25. The method of claim 15, wherein the information element includes a tool tip.

26. The method of claim 15, further comprising displaying a second information element when the cursor points to another area in the display.

27. The method of claim 15, further comprising providing an additional level of information if the cursor continues to point to the area after a previous level of information is displayed.

28. The method of claim 15, wherein the subsequent level of information is displayed only if the cursor continues to point to the area and at least one keystroke is activated.

29. The method of claim 15, where the one level of information describes the function, and the subsequent level of information further describes the function.

30. A program, fixed in a storage medium, for use in creating a graphical display on a computer monitor, the program comprising executable instructions that enable a computer system to:

(a) display a cursor that allows a user to point to an area of interest in the graphical display; and (b) display an information element that provides a first level of information in the graphical display when the cursor first points to the area of interest and then provides a subsequent level of information in the display if the cursor continues to point to the area of interest.

31. The program of claim 30, wherein the subsequent level of information is displayed only if the cursor continues to point to the area for a predetermined amount of time.

32. The program of claim 31, further comprising executable instructions that enable a computer system to allow the user to determine the predetermined amount of time.

33. The program of claim 30, further comprising executable instructions that enable a computer system to replace the first level of information in the display with the subsequent level of information.

34. The program of claim 30, wherein the subsequent level of information includes more information than the first level of information.

35. The program of claim 30, wherein the subsequent level of information includes a text item.

36. The program of claim 30, wherein the subsequent level of information includes a video clip.

37. The program of claim 30, wherein the subsequent level of information includes an audio clip.

38. The program of claim 30, further comprising executable instructions that enable a computer system to provide an additional level of information if the cursor continues to point to the area after a previous level of information is displayed.

39. The program of claim 30, further comprising executable instructions that enable a computer system to remove the information element from the graphical display when the user takes a prescribed action.

40. The program of claim 30, wherein the information element includes a tool tip.

41. The program of claim 30, further comprising executable instructions that enable a computer system to display a second information element when the cursor points to another area in the display.

42. The program of claim 30, further comprising executable instructions that enable a computer system to provide an additional level of information if the cursor continues to point to the area after a previous level of information is displayed.

43. The program of claim 30, wherein the subsequent level of information is displayed only if the cursor continues to point to the area and at least one keystroke is activated.

44. The program of claim 30, where the first level of information describes the area of interest, and the subsequent level of information further describes the area of interest.

* * * * *